Figure 1:
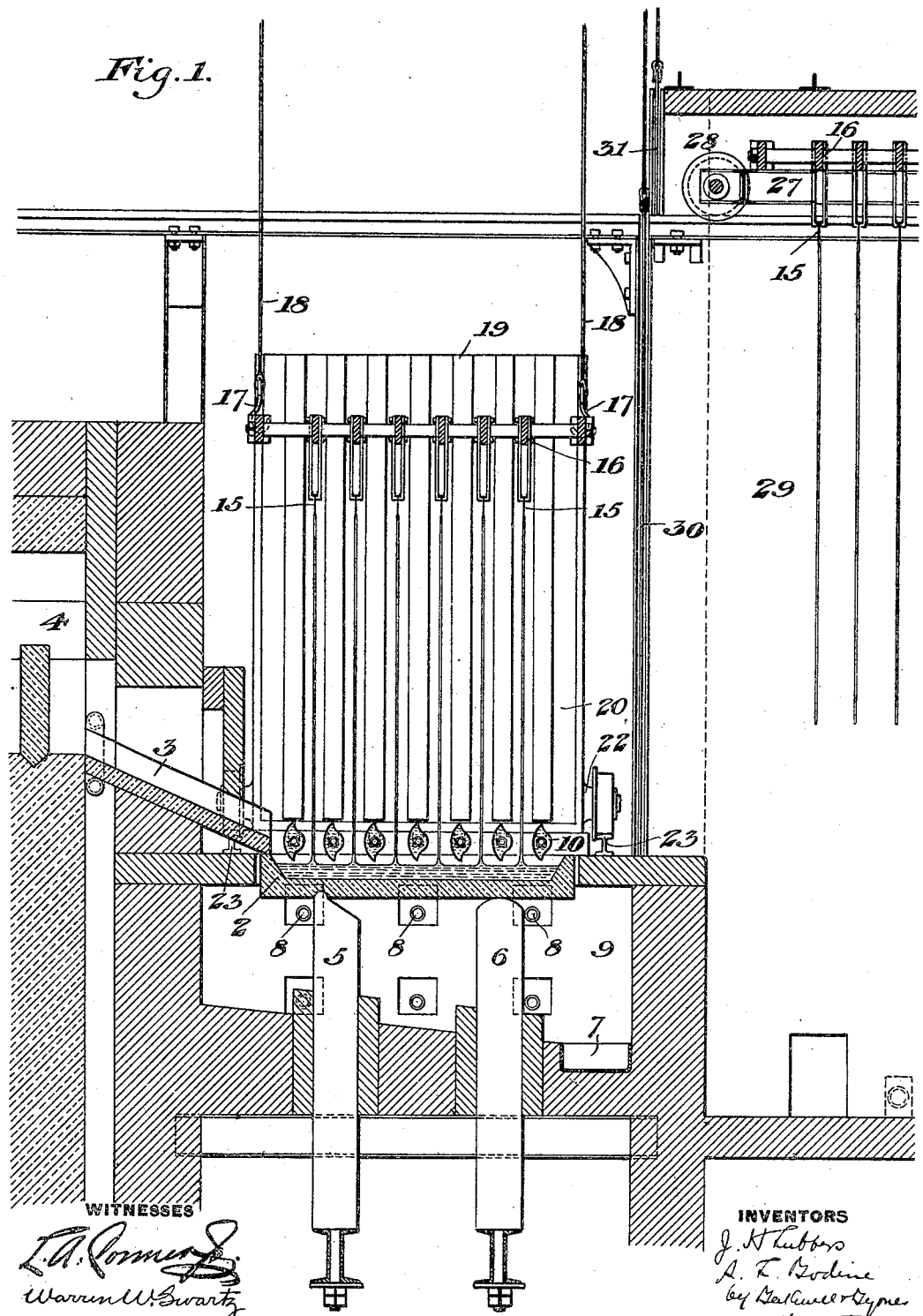

No. 807,298. PATENTED DEC. 12, 1905.
J. H. LUBBERS & S. L. BODINE.
MANUFACTURE OF GLASS SHEETS.
APPLICATION FILED OCT. 19, 1904.

3 SHEETS—SHEET 1.

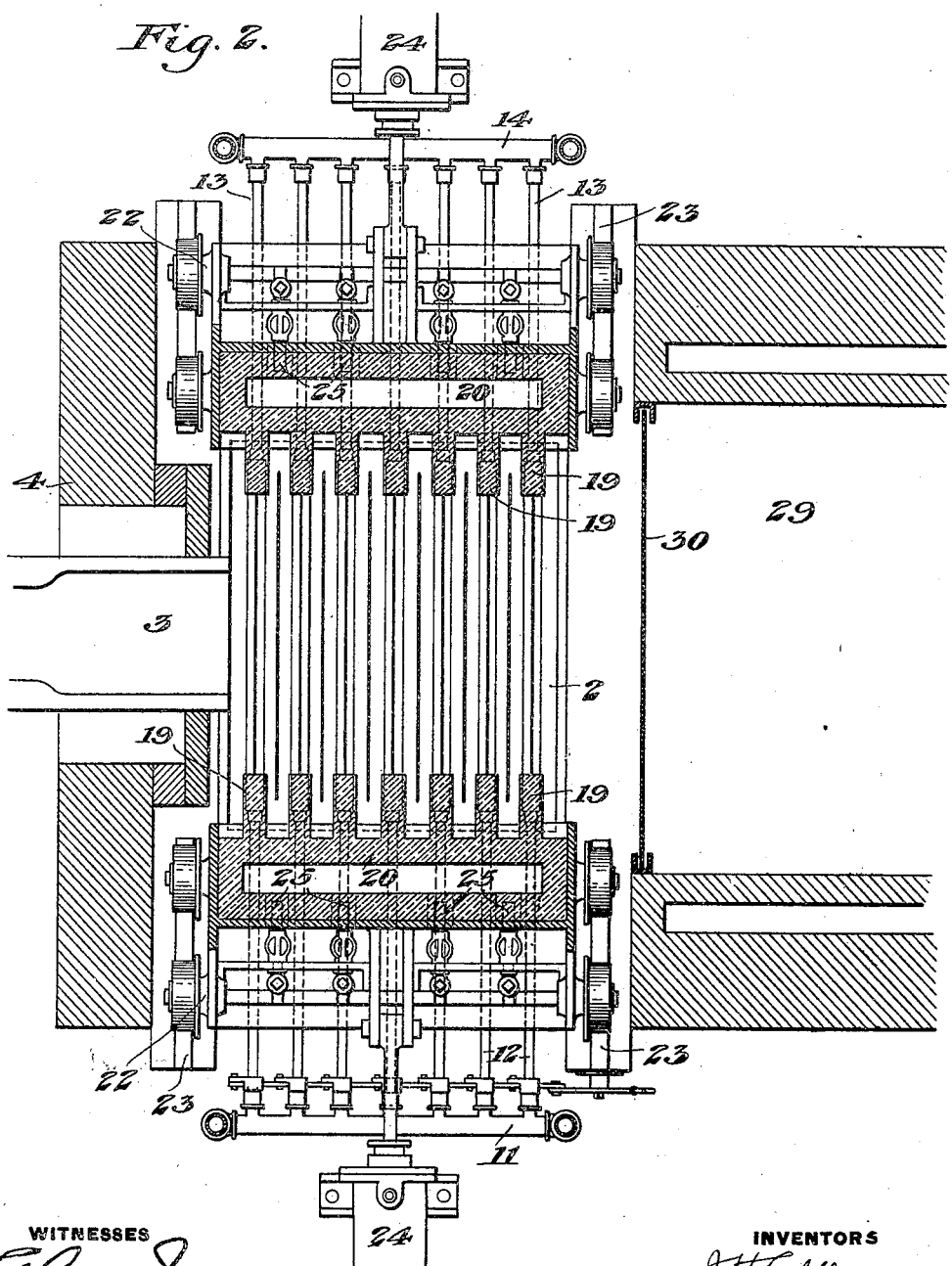

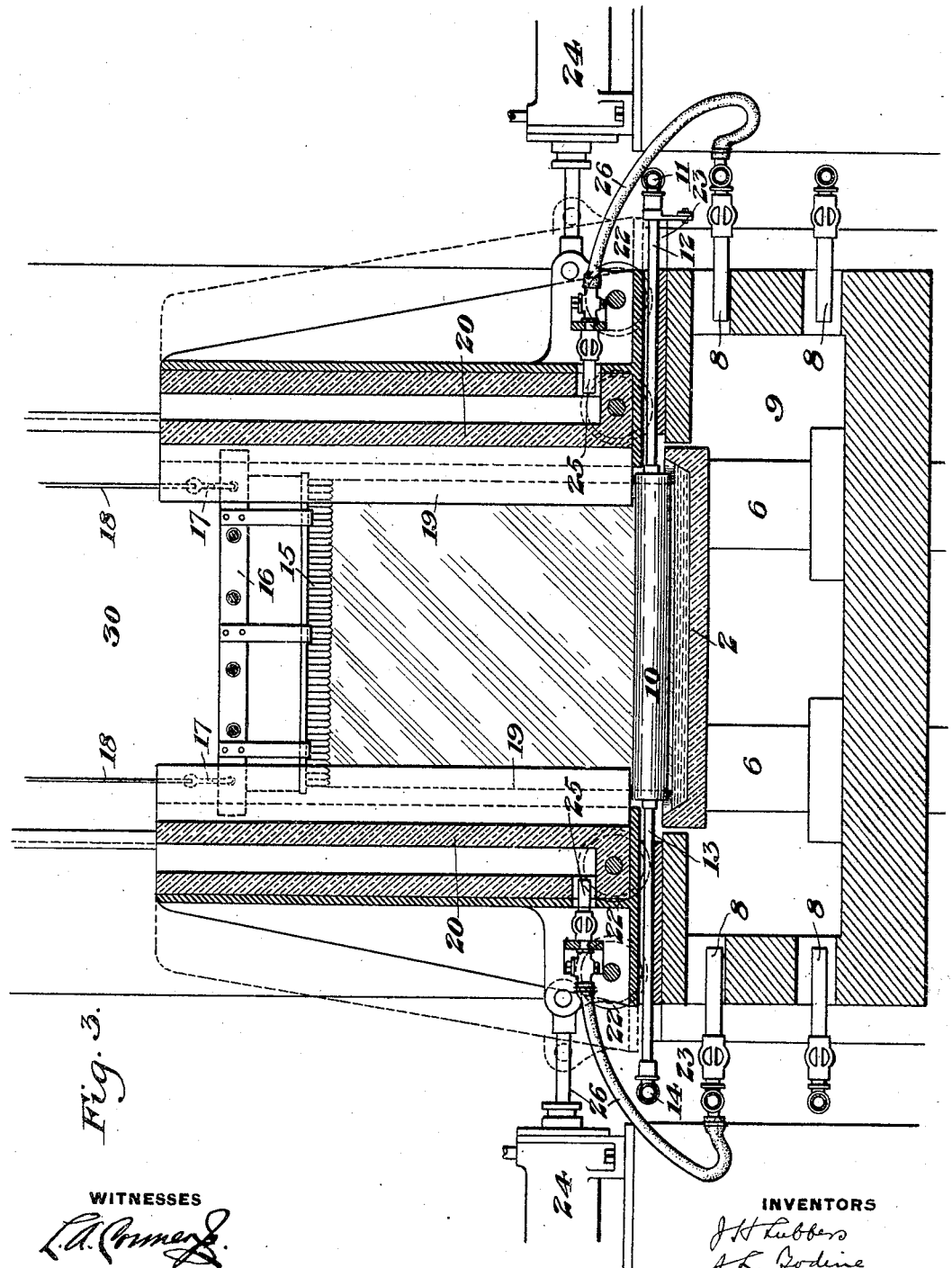

UNITED STATES PATENT OFFICE.

JOHN H. LUBBERS, OF ALLEGHENY, AND SAMUEL LAURENCE BODINE, OF BERWYN, PENNSYLVANIA, ASSIGNORS TO WINDOW GLASS MACHINE COMPANY, OF PITTSBURG, PENNSYLVANIA, A CORPORATION OF NEW JERSEY.

MANUFACTURE OF GLASS SHEETS.

No. 807,298.     Specification of Letters Patent.     Patented Dec. 12, 1905.

Application filed October 19, 1904. Serial No. 229,084.

*To all whom it may concern:*

Be it known that we, JOHN H. LUBBERS, of Allegheny, Allegheny county, and SAMUEL LAURENCE BODINE, of Berwyn, Chester county, Pennsylvania, have invented a new and useful Improvement in the Manufacture of Glass Sheets, of which the following is a full, clear, and exact description, reference being had to the accompanying drawings, forming part of this specification, in which—

Figure 1 is a longitudinal vertical section showing a portion of apparatus constructed in accordance with our invention. Fig. 2 is a horizontal cross-section of the same, and Fig. 3 is a vertical cross-section showing the manner of drawing.

Our invention relates to the drawing of glass sheets or similar articles, and is designed to provide a simple and cheap method therefor.

Heretofore in the drawing of glass sheets or similar articles it has been considered necessary to draw the sheet or sheets upwardly into a gaseous bath or inclosed atmosphere to retard the cooling and enable the glass to be saved. This was carried out by the use of an inclosed chamber.

In carrying out our invention we do away with the use of the inclosed drawing-chamber and draw the sheet or sheets upwardly within the open air by heating or retarding the cooling of the edge portions of the sheet or sheets. By retarding the cooling of the edge portions we prevent the cracking of the sheets, as we have found that these cracks usually start from the edge and may be prevented by preventing rapid cooling of the edge portions. We also preferably draw a plurality of sheets at the same time, retarding the cooling of their edges during drawing, so that the outer sheets protect the inner ones and avoid warping and improper drawing.

In the drawings, in which we show one form of apparatus for carrying out our invention, 2 represents the pan or pot, into which the molten glass may be fed through a spout or chute 3 from the furnace 4. This pot may be supported upon posts 5 and 6, of which the posts 6 may be raised and lowered, so as to empty the refuse glass into a receptacle 7, the heat of the burners 8 in the chamber 9 assisting in this operation.

Over the pan we preferably provide water-cooled bars 10, which may be turned into the position shown in Fig. 1 during drawing or swung into the position at right angles thereto, so as to practically cover the pan. Water may be supplied to these shields through pipes 11 and 12, leading from the supply and exhaust pipes 13 and 14.

The baits 15 may be supported on a frame 16, lifted by hooks 17, connected by cords 18 with suitable lifting apparatus. The baits when lowered extend between the inwardly-projecting partitions or baffles 19 of the hollow side walls 20. Each of these hollow walls is provided with suitable metal framing inclosing the hollow refractory wall, with its projections 19, and resting upon a car or truck 22, movable on tracks 23 by means of motive cylinder 24. These motive cylinders are hand-controlled, so that the hollow side walls may be moved back and forth as desired. These walls are heated by burners 25, having flexible pipes 26, forming branches from the main burners 8, the heat discharging into the base of the wall-cavity and flowing out at its open top. Where the refractory projections are used, the wall may be or may not be hollow and may or may not be heated, as the heat from the operation may heat up the refractory projections sufficiently for our purpose without supplying additional heat.

Instead of the refractory projections we may employ simply gas-burners suitably arranged to heat the edges of the sheets as they are drawn.

After the sheets are drawn up the desired distance, their edges being heated during drawing or the cooling thereof retarded, their lower ends may be severed from the glass in the pot and the drawing-frame then lifted to allow the U-shaped frame 27 of the leer-car 28 to be moved under the ends of the bait cross-frame. The bait-frame may then be lowered on the car, which is moved into the leer 29 and gradually carried through it. The entrance to the leer is protected by the valves 30 and 31. After the one set of sheets is taken into the leer the leer-opening is closed, another bait-frame supported on the drawing-ropes or supports, the glass in the pot brought into suitable condition, and another set of sheets drawn upwardly.

Before each set of sheets is moved laterally into the leer the hollow walls are of course drawn back to allow the sheets to move sidewise, these walls being moved into position again before the next drawing operation.

The advantages of our invention result from the drawing of the sheet or sheets in the open air, which can be done by retarding the cooling of their edges only. This does away with the use of an inclosed drawing-chamber and makes the operation easier.

Many variations may be made in the form and arrangement of the drawing apparatus and the other parts without departing from our invention.

We claim—

1. The method of forming glass sheets, consisting in drawing a sheet upwardly from a glass-bath in the open air, and retarding the cooling of the edges of the sheet; substantially as described.

2. The method of forming glass sheets, consisting in drawing a plurality of glass sheets simultaneously and upwardly into the open air, and retarding the cooling of their edge portions during drawing; substantially as described.

3. The method of forming glass sheets, consisting in simultaneously drawing a plurality of glass sheets upwardly from a bath and within the open air, applying heat to the edge portions of the sheets and then passing said sheets through an annealing-leer; substantially as described.

4. The method of forming glass sheets, consisting in engaging the lower edge of a bait with the glass of a bath, drawing the sheet vertically from the bath in the open air, and retarding the cooling of the edge portions only of the sheet; substantially as described.

In testimony whereof we have hereunto set our hands.

JOHN H. LUBBERS.
S. LAURENCE BODINE.

Witnesses:
JOHN MILLER,
H. M. CORWIN.